(12) United States Patent
Sakamaki et al.

(10) Patent No.: US 8,588,560 B2
(45) Date of Patent: Nov. 19, 2013

(54) OPTICAL 90-DEGREE HYBRID CIRCUIT

(75) Inventors: Yohei Sakamaki, Atsugi (JP); Takashi Goh, Atsugi (JP); Toshikazu Hashimoto, Atsugi (JP); Yusuke Nasu, Atsugi (JP); Kuninori Hattori, Atsugi (JP); Hiroshi Takahashi, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 219 days.

(21) Appl. No.: 13/378,034

(22) PCT Filed: Jul. 9, 2010

(86) PCT No.: PCT/JP2010/004489
§ 371 (c)(1),
(2), (4) Date: Dec. 13, 2011

(87) PCT Pub. No.: WO2011/004614
PCT Pub. Date: Jan. 13, 2011

(65) Prior Publication Data
US 2012/0093457 A1 Apr. 19, 2012

(30) Foreign Application Priority Data
Jul. 10, 2009 (JP) .................................. 2009-164176

(51) Int. Cl.
*G02B 6/12* (2006.01)
*G02B 6/26* (2006.01)
*G02B 6/42* (2006.01)
*H04B 10/00* (2013.01)

(52) U.S. Cl.
USPC .................. 385/14; 385/31; 385/45; 398/202

(58) Field of Classification Search
USPC ........................................................ 385/14
See application file for complete search history.

(56) References Cited

U.S. PATENT DOCUMENTS 6,917,031 B1 * 7/2005 Sun et al. .................. 250/214 R
8,335,438 B2 * 12/2012 Kim et al. ..................... 398/154
(Continued)

FOREIGN PATENT DOCUMENTS

JP 2008-177759 7/2008
WO WO 03/063515 7/2003

OTHER PUBLICATIONS

English translation of International Preliminary Report on Patentability for International Application No. PCT/JP2010/004489, filed Jul. 9, 2010, mailed Feb. 23, 2012.

(Continued)

*Primary Examiner* — Rhonda Peace
(74) *Attorney, Agent, or Firm* — Workman Nydegger

(57) ABSTRACT

An optical 90-degree hybrid circuit includes a first demultiplexing optical coupler having two or more first input ports and two or more first output ports, a second demultiplexing optical coupler having two or more second input ports and two or more second output ports, two first arm waveguides connected to the first output ports, two second arm waveguides connected to the second output ports, a 90-degree phase shift section installed in one of the four arm waveguides, a first optical coupler and a second optical coupler connected to the first arm waveguides and the second arm waveguides, a first optical waveguide for connecting an optical splitter and the first input ports, and a second optical waveguide for connecting the optical splitter and the second input ports, wherein an optical length of the first optical waveguide is different from that of the second optical waveguide.

4 Claims, 13 Drawing Sheets

(56) References Cited

U.S. PATENT DOCUMENTS

| | | | |
|---|---|---|---|
| 8,442,364 B2* | 5/2013 | Watanabe | 385/31 |
| 2012/0082414 A1* | 4/2012 | Sakamaki et al. | 385/31 |
| 2012/0093457 A1* | 4/2012 | Sakamaki et al. | 385/14 |
| 2012/0141067 A1* | 6/2012 | Sakamaki et al. | 385/31 |

OTHER PUBLICATIONS

International Preliminary Report on Patentability for Application No. PCT/JP2010/004489, filed Jul. 9, 2010, mailed Jan. 19, 2012.

International Search Report dated Oct. 12, 2010 for International Application No. PCT/JP2010/004489.

Sun Hyok Chang et al., *Impact of Quadrature Imbalance in Optical Coherent QPSK Receiver*, IEEE Photonics Technology Letters, vol. 21, No. 11, Jun. 1, 2009, pp. 709-711.

Y. Hashizume et al., *Integrated Polarisation Beam Splitter Using Waveguide Birefringence Dependence on Wageguide Core Width*, Electronics Letters, vol. 37, No. 25, Dec. 6, 2001, pp. 1517-1518.

Yasuaki Hashizume et al., *Silica PLC-VOA Using Suspended Narrow Ridge Structures and its Application to V-AWG*, Optical Fiber Communication conference, OWO4, 2007, 3 pages.

Matthias Seimetz et al., *Options, Feasibility, and Availability of 2×4 90° Hybrids for Coherent Optical Systems*, Journal of Lightwave Technology, vol. 24, No. 3, Mar. 2006, pp. 1317-1322.

Giulio Colavolpe et al., *Robust Multilevel Coherent Optical Systems with Linear Processing at the Receiver*, Journal of Lightwave Technology, vol. 27, No. 13, Jul. 1, 2009, pp. 2357-2369.

T Hashimot et al., *Compact DQPSK Demodulator with Interwoven Double Mach-Zehnder Interferometer Using Planar Lightwave Circuit*, ECOC 2008, Sep. 2008, vol. 1, 3 pages.

\* cited by examiner

OPTICAL 90-DEGREE HYBRID CIRCUIT

TECHNICAL FIELD

This invention relates to an optical 90-degree hybrid circuit constituting an optical receiver used in a coherent receiver system in an optical transmission system, and in particular, to an optical 90-degree hybrid circuit provided with an optical 90-degree hybrid function and a monitoring function of a phase difference between in-phase output and quadrature output.

BACKGROUND ART

Attention has been drawn to an optical multilevel modulation method in aiming for constructing a super-high-speed optical transmission system of 100 Gbit/s or higher. In particular, a coherent receiving method such as DP-QPSK (Dual Polarization Quadrature Phase-Shift Keying) has attracted attention because of its advantages of enhanced optical noise immunity and compensation performance by electrical signal processing on wavelength dispersion distortion after photoelectric conversion. An application of the coherent receiver system to the transmission system has been actively studied. An optical receiver used in the coherent receiver system comprises a local oscillation light generating apparatus for generating local oscillation light, a polarization beam splitter for separating a signal light and a local oscillation light into different output ports corresponding to a polarization state, an optical 90-degree hybrid circuit for wave-combining the signal light and the local oscillation light, a photoelectric conversion section for converting an output signal from the optical 90-degree hybrid circuit into an electrical signal, an AD converter for converting the electrical signal from the photoelectric conversion section into a digital signal, and a digital signal processing (DSP) circuit for processing the digital signal. By separately detecting an in-phase component and a quadrature component of interference light of the inputted signal light and the inputted local oscillation light, it is possible to obtain information of the inputted signal light.

Among construction parts of the optical receiver used in the coherent receiver system, as to the optical 90-degree hybrid circuit, a product constituted by a spatial optical system having combined bulk type optics has been already developed and commercialized. Meanwhile, a planar light wave circuit (PLC) including optical waveguides formed on a planar substrate is superior to the above-described spatial optical system in terms of mass production capabilities and reliability. In addition, by adopting the PLC optical 90-degree hybrid circuit, for example, the feasibility in regard to integration of the polarization beam splitter and the photoelectric conversion section is increased as compared to the spatial optical system, enabling a provision of a smaller-sized optical receiver. Under these circumstances, it is expected to put the PLC optical 90-degree hybrid circuit into practice.

FIG. 1 is a construction diagram showing a conventional PLC optical 90-degree hybrid circuit. The conventional PLC optical 90-degree hybrid circuit is shown in Patent Literature 1. Patent Literature 1 relates to an optical delay interference circuit used for demodulation of a DQPSK (differential quadrature phase-shift keying) signal. This circuit itself does not correspond to the part constituting the optical receiver used in the coherent receiver system, but includes, as a part of the circuit, a function as the optical 90-degree hybrid circuit which combines two optical waves and separates the combined wave into an in-phase component and a quadrature component. Hereinafter, the in-phase component is referred to as "I component", and the quadrature component is referred to as "Q component". In FIG. 1, among the optical circuits described in Patent Literature 1, the construction of a circuit part alone necessary for realizing the optical 90-degree hybrid circuit is extracted to be shown.

Here, the operational principle of the conventional PLC optical 90-degree hybrid circuit shown in FIG. 1 is described. A signal light inputted from the PLC external is branched into two lights by an optical splitter 2a via an input waveguide 1a. A local oscillation light inputted from the PLC external is branched into two lights by an optical splitter 2b via an input waveguide 1b. The lights branched into two portions by the optical splitter 2a are inputted into two optical couplers 3a and 3b via arm waveguides 10a and 10b. The lights branched into two portions by the optical splitter 2b are inputted into the two optical couplers 3a and 3b via arm waveguides 10c and 10d. The signal light and the local oscillation light inputted into each of the optical coupler 3a and the optical coupler 3b are combined to be interfered with each other, which is branched into two lights for output so that a phase difference between the interference lights becomes 180 degrees. The interference lights of the signal light and the local oscillation light outputted from the optical coupler 3a travel via output waveguides 4a and 5a and are outputted into a differential optical receiver section 6a formed as an external circuit and serving as a photoelectric conversion section. The interference lights of the signal light and the local oscillation light outputted from the optical coupler 3b travel via output waveguides 4b and 5b and are outputted into a differential optical receiver section 6b formed as an external circuit and serving as a photoelectric conversion section.

A 90-degree phase shift section is provided in any one of the four arm waveguides 10a, 10b, 10c, and 10d. Thereby the interference lights outputted via the output waveguides 4a, 4b, 5a and 5b from the respective optical coupler 3a and the optical coupler 3b can be differentially demodulated by the differential optical receivers 6a and 6b to separate I component and Q component of the inputted modulation signal. Here, for simultaneously detecting I component and Q component of the modulation signal, it is necessary that waveguide lengths of the two arm waveguides 10a and 10b for transmitting the signal lights branched in the optical splitter 2a each are made equal and waveguide lengths of the two arm waveguides 10c and 10d for transmitting the local oscillation lights branched in the optical splitter 2b each are made equal excluding the 90-degree phase shift section 7. Further, waveguide lengths of the four arm waveguides 10a, 10b, 10c and 10d each are made equal excluding the 90-degree phase shift section 7, and thereby, it is possible to use this circuit also as the optical 90-degree hybrid circuit constituting the optical delay interference circuit for receiving the differential phase modulation signal such as DQPSK.

However, the problem as explained below will occur because of the construction of the 90-degree phase shift section 7. The 90-degree phase shift section 7 is installed aiming at changing an optical path length through which propagation light passes by an amount of $\lambda \times (\pm 1/4 + m)$ only. Here, $\lambda$ indicates a wave length of a signal light or a local oscillation light and m indicates an integral number. As shown in NPL 1, when a phase shift $\theta$ of the propagation light in the 90-degree phase shift section 7 is shifted out of 90 degrees, the receiving characteristic is deteriorated. For example, in a case of not correcting the shift of the phase shift $\theta$ out of 90 degrees in the digital signal processing circuit, it is necessary to control the shift of the phase shift $\theta$ out of 90 degrees within $\pm$ five degrees for restricting OSNR (optical signal noise ratio) penalty below 0.5 dB in a case of a BER (bit error rate)=10-3.

Controlling the shift of the phase shift θ out of 90 degrees in the 90-degree phase shift section 7 within ±five degrees means that it is necessary to restrict a shift of an adjustment amount in the optical path light below about 2.8% of the wavelength. For realizing such control of the phase shift θ with high accuracy, the method of controlling a phase difference between In-phase output and Quadrature output (hereinafter, called "IQ phase difference") with high accuracy is absolutely necessary, and also it is industrially preferable that the method is simple.

FIG. 2 is the construction diagram showing a measurement method of the IQ phase difference in the conventional optical 90-degree hybrid circuit An optical delay circuit section 13 constructed of an optical splitter 11, a delay line 12 and an optical waveguide 15 is coupled to the input waveguides 1a and 1b in the conventional 90-degree hybrid circuit 8 shown in FIG. 1 for measuring the IQ phase difference. This construction aims at constructing the optical delay interference circuit by a way that instead of the signal light and the local oscillation light in FIG. 1, light outputted from the same light source is branched, one of the branched lights passes through the delay line 12 for a delay and the lights are inputted to the input waveguides 1a and 1b in the optical 90-degree hybrid circuit 8. Without mentioning, the optical path length of the delay line 12 is designed to be different from that of the optical waveguide 15.

As shown in Patent Literature 1, in a case where a difference in the optical path length between the delay line 12 and the optical waveguide 15, that is, the delay amount corresponds to one symbol amount of the signal modulated by the DQPSK method, the circuit construction shown in FIG. 2 functions as the optical delay interferometer for receiving the modulation signal of the DQPSK method. With this optical delay interference circuit, it is possible to calculate relative phase differences between lights outputted from the output waveguides 4a, 4b, 5a and 5b based upon transmission spectra outputted from the output waveguides 4a, 4b, 5a and 5b. By removing the optical delay circuit section 13 from this circuit construction after IQ phase difference evaluation is made, this circuit functions as the optical 90-degree hybrid circuit shown in FIG. 1.

CITATION LIST

Patent Literature

PTL 1: Pamphlet of International Patent Laid-Open No. WO 2003/063515

Non Patent Literature

NPL 1: S. H. Chang, H. S. Chung and K. Kim, "Impact of quadrature imbalance in optical coherent QPSK receiver", IEEE Photonics Technology Letters, vol. 21, no. 11, pp. 709-711, Jun. 1, 2009
NPL 2: Y. Hashizume, R. Kasahara, T. Saida, Y. Inoue and M. Okano, "Integrated polarisation beam splitter using waveguide birefringence dependence on waveguide core width", Electronics Letters, vol. 37, no. 25, pp. 1517-1518, 6 Dec. 2001.
NPL 3: Y. Hashizume, K. Watanabe, Y. Nasu, M. Kohtoku, S. Kamei, T. Kitoh and Y. Inoue, "Silica PLC-VOA using suspended narrow ridge structures and its application to V-AWG", Optical Fiber Communication conference, OWO4, 2007.

SUMMARY OF INVENTION

Technical Problem

However, since it is required to input lights outputted from the two different light sources into the two different input waveguides in the 90-degree hybrid circuit, it is necessary to remove the optical delay circuit section 13 after the IQ phase difference evaluation in the conventional IQ phase difference evaluation shown in FIG. 2. Further, there occurs a problem that after the removal of the optical delay circuit section 13, the IQ phase difference evaluation of the optical 90-degree hybrid circuit can not be made.

The present invention is made in view of the foregoing problem and an object of the present invention is to provide an optical 90-degree hybrid circuit provided with an optical 90-degree hybrid function and a monitoring function of an IQ phase difference thereof. The circuit construction suitable for an addition of the monitoring function of the IQ phase difference is proposed.

Solution to Problem

For achieving such an object, the invention as defined in claim 1 according to the present invention is provided with an optical 90-degree hybrid circuit comprising a first input waveguide, a first demultiplexing optical coupler including at least two first input ports and at least two first output ports, wherein the first input waveguide is connected to one of the first input ports and light inputted into the first input waveguide is branched, a second input waveguide, a second demultiplexing optical coupler including at least two second input ports and at least two second output ports, wherein the second input waveguide is connected to one of the second input ports and light inputted into the second input waveguide is branched, two first arm waveguides connected to two of the first output ports, two second arm waveguides connected to two of the second output ports, a 90-degree phase shift section installed in one of the four arm waveguides composed of the two first arm waveguides and the two second arm waveguides to shift a phase of light by 90 degrees, a first optical coupler connected to one of the two first arm waveguides and one of the two second arm waveguides, a second optical coupler connected to the other of the two first arm waveguides and the other of the two second arm waveguides, a third input waveguide, an optical splitter connected to the third input waveguide and branching light inputted into the third input waveguide into two lights, a first optical waveguide connecting the optical splitter and the one remaining port of the first input ports, and a second optical waveguide connecting the optical splitter and the one remaining port of the second input ports, wherein an optical path length of the first optical waveguide is different from that of the second optical waveguide.

According to the optical 90-degree hybrid circuit as defined in claim 1, the invention as defined in claim 2 is provided with the optical 90-degree hybrid circuit, wherein the first demultiplexing optical coupler comprises a first polarization beam splitter including the two first input ports and branching the inputted light into two lights corresponding to a polarization state and a first splitter connected to the first polarization beam splitter for branching the inputted light into two lights, and the second demultiplexing optical coupler comprises a second polarization beam splitter including the two second input ports and branching the inputted light into two lights corresponding to a polarization state and a second splitter connected to the second polarization beam splitter for branching the inputted light into two lights.

According to the optical 90-degree hybrid circuit as defined in claim 1, the invention as defined in claim 3 is provided with the optical 90-degree hybrid circuit, wherein the second demultiplexing optical coupler comprises an optical attenuator for adjusting a strength level of the inputted light, and an optical splitter connected to the optical attenuator and branching the inputted light into two lights.

The invention as defined in claim 4 is provided with an optical 90-degree hybrid circuit comprising a first input waveguide, a first demultiplexing optical coupler including at least two first input ports and at least two first output ports, wherein the first input waveguide is connected to one of the first input ports and light inputted into the first input waveguide is branched, a second input waveguide, a second demultiplexing optical coupler including at least two second input ports and at least two second output ports, wherein the second input waveguide is connected to one of the second input ports and light inputted into the second input waveguide is branched, two first arm waveguides connected to two of the first output ports, two second arm waveguides connected to two of the second output ports, a 90-degree phase shift section installed in any one of the two second arm waveguides to shift a phase of light by 90 degrees, a first optical coupler connected to one of the two first arm waveguides and one of the two second arm waveguides, a second optical coupler connected to the other of the two first arm waveguides and the other of the two second arm waveguides, a third input waveguide, an optical splitter connected to the third input waveguide and branching light inputted into the third waveguide into two lights, a first optical waveguide connecting the optical splitter and the one remaining port of the first input ports, a second optical waveguide connecting the optical splitter and the one remaining port of the second input ports, wherein an optical path length of the two first arm waveguides is different from that of the two second arm waveguides.

Advantageous Effects of Invention

According to the present invention, it is possible to realize the function of the optical 90-degree hybrid circuit while monitoring the IQ phase difference in the optical 90-degree hybrid circuit all the time. The optical coupler provided with the two or more input ports and the two or more output ports is used as the optical splitter for branching the light inputted into the optical 90-degree hybrid circuit. Further, the optical splitter for branching the light for monitoring the IQ phase difference into two lights, the optical waveguide for coupling one of the branched lights to the input port of the above optical coupler, and the optical waveguide for coupling the other of the branched lights to the input port of the above different optical coupler are arranged. The optical path lengths of the two routes after the light for monitoring the IQ phase difference is branched into the two lights are designed to be different from each other between the branched point and the optical coupler for interference of the signal light and the local oscillation light, and thereby there is provided the circuit construction provided with the function of the optical 90-degree hybrid circuit and the monitoring function of the IQ phase difference.

DESCRIPTION OF EMBODIMENTS

The present invention provides an optical 90-degree hybrid circuit provided with an optical 90-degree hybrid function and a monitoring function of an IQ phase difference thereof.

Figure 3:
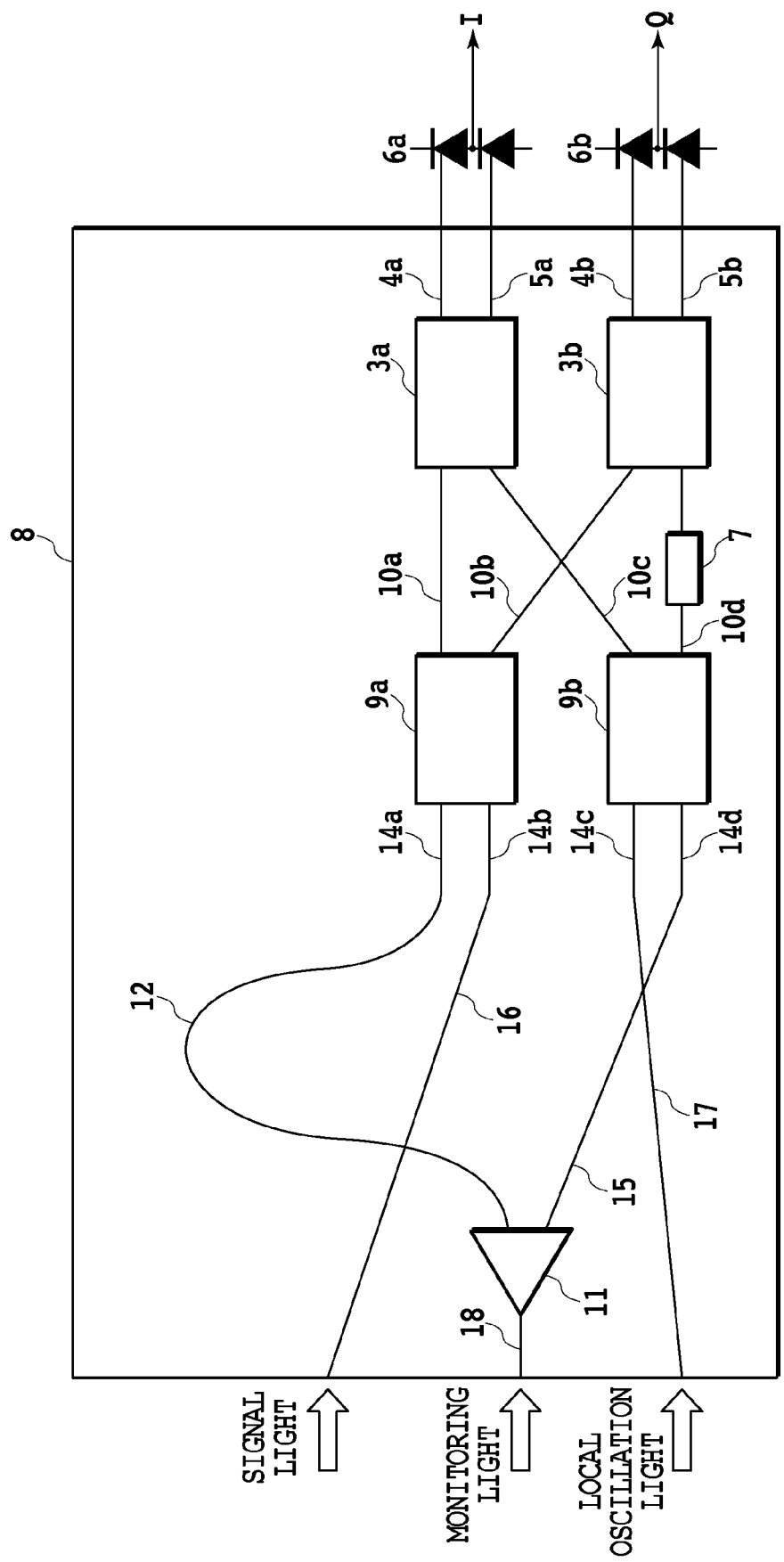
FIG. 3 is a construction diagram showing an optical 90-degree hybrid circuit according to an embodiment of the present invention.

FIG. 3 is a diagram showing the construction of an optical 90-degree hybrid circuit to which a monitoring function of an IQ phase difference is added according to the present invention. An optical 90-degree hybrid circuit 8 according to the present invention comprises an optical splitter 11 coupled to a monitoring light input waveguide 18, a delay line 12 and an optical waveguide 15 connected to the optical splitter 11, a demultiplexing optical coupler 9a coupled to an input waveguide 14a connected to the delay line 12 via an input port and coupled to an input waveguide 14b connected to an optical waveguide 16 via an input port, a demultiplexing optical coupler 9b coupled to an input waveguide 14c connected to the optical waveguide 15 and coupled to an input waveguide 14d connected to an optical waveguide 17, arm waveguides 10a and 10b coupled to output ports of the demultiplxing optical coupler 9a, arm waveguides 10c and 10d coupled to output ports of the demultiplxing optical coupler 9b, an optical coupler 3a coupled to the arm waveguides 10a and 10c, an optical coupler 3b coupled to the arm waveguides 10b and 10d, a 90-degree phase shift section 7 installed in the arm waveguide 10d, output waveguides 4a and 5a coupled to the optical coupler 3a, and output waveguides 4b and 5b coupled to the optical coupler 3b.

Here, an explanation will be made of respective construction elements for realizing the optical 90-degree hybrid function according to the present invention. The signal light inputted from the PLC external is inputted via the optical waveguide 16 into the demultiplexing optical coupler 9a coupled to the input waveguide 14b. The local oscillation light inputted from the PLC external is inputted via the optical waveguide 17 into the demultiplexing optical coupler 9b coupled to the input waveguide 14c. The signal light inputted into the demultiplexing optical coupler 9a is branched. The local oscillation light inputted into the demultiplexing optical coupler 9b is branched. One of the lights branched by the demultiplexing optical coupler 9a is inputted into the optical coupler 3a via the arm waveguide 10a, and the other one is inputted into the optical coupler 3b via the arm waveguide 10b. One of the lights branched by the demultiplexing optical coupler 9b is inputted into the optical coupler 3a via the arm waveguide 10c, and the other one a phase of which is shifted by 90 degrees by the 90-degree phase shift section 7 in the arm waveguide 10d is inputted into the optical coupler 3b via the arm waveguide 10d. Two lights inputted into the optical coupler 3a are combined to create interference light. Two lights inputted into the optical coupler 3b are combined to create interference light. The interference lights outputted from the optical coupler 3a are outputted via the output waveguides 4a and 5a into a differential receiver 6a. The interference lights outputted from the optical coupler 3b are outputted via the output waveguides 4b and 5b into a differential receiver 6b.

Further, an explanation will be made of respective construction elements relating to the monitoring function of the IQ phase difference according to the present invention. The monitoring light inputted from the PLC external is inputted via the monitoring light input waveguide 18 into the optical splitter 11 to be branched into two lights. One of the two branched monitoring lights is inputted via the delay line 12 into the demultiplexing optical coupler 9a coupled to the input waveguide 14a. The other one of the two branched monitoring lights is inputted via the optical waveguide 15 into the demultiplexing optical coupler 9b coupled to the input waveguide 14c. The monitoring light inputted into the demultiplexing optical coupler 9a is branched. The monitoring light inputted into the demultiplexing optical coupler 9b is branched. One of the monitoring lights branched by the demultiplexing optical coupler 9a is inputted into the optical coupler 3a via the arm waveguide 10a, and the other one is inputted into the optical coupler 3b via the arm waveguide 10b. One of the lights branched by the demultiplexing optical coupler 9b is inputted into the optical coupler 3a via the arm waveguide 10c, and the other one a phase of which is shifted by 90 degrees by the 90-degree phase shift section 7 in the arm waveguide 10d is inputted into the optical coupler 3b via the arm waveguide 10d. The two lights inputted into the optical coupler 3a are combined to create interference light. The two lights inputted into the optical coupler 3b are combined to create interference light. The interference lights outputted from the optical coupler 3a are outputted via the output waveguides 4a and 5a into the differential receiver 6a. The interference lights outputted from the optical coupler 3b are outputted via the output waveguides 4b and 5b into the differential receiver 6b.

The delay line 12 delays one of the lights branched by the optical splitter 11 to provide a phase difference between the one and the branched other. Each of the demultiplexing optical couplers 9a and 9b has two or more input ports and two or more output ports.

Each of the differential receivers 6a and 6b is formed as an external circuit, functions as a photoelectric conversion section, and differentially demodulates the interference lights outputted from each of the optical couplers 3a and 3b to separate the inputted modulation signal into I component and Q component.

Figure 1:
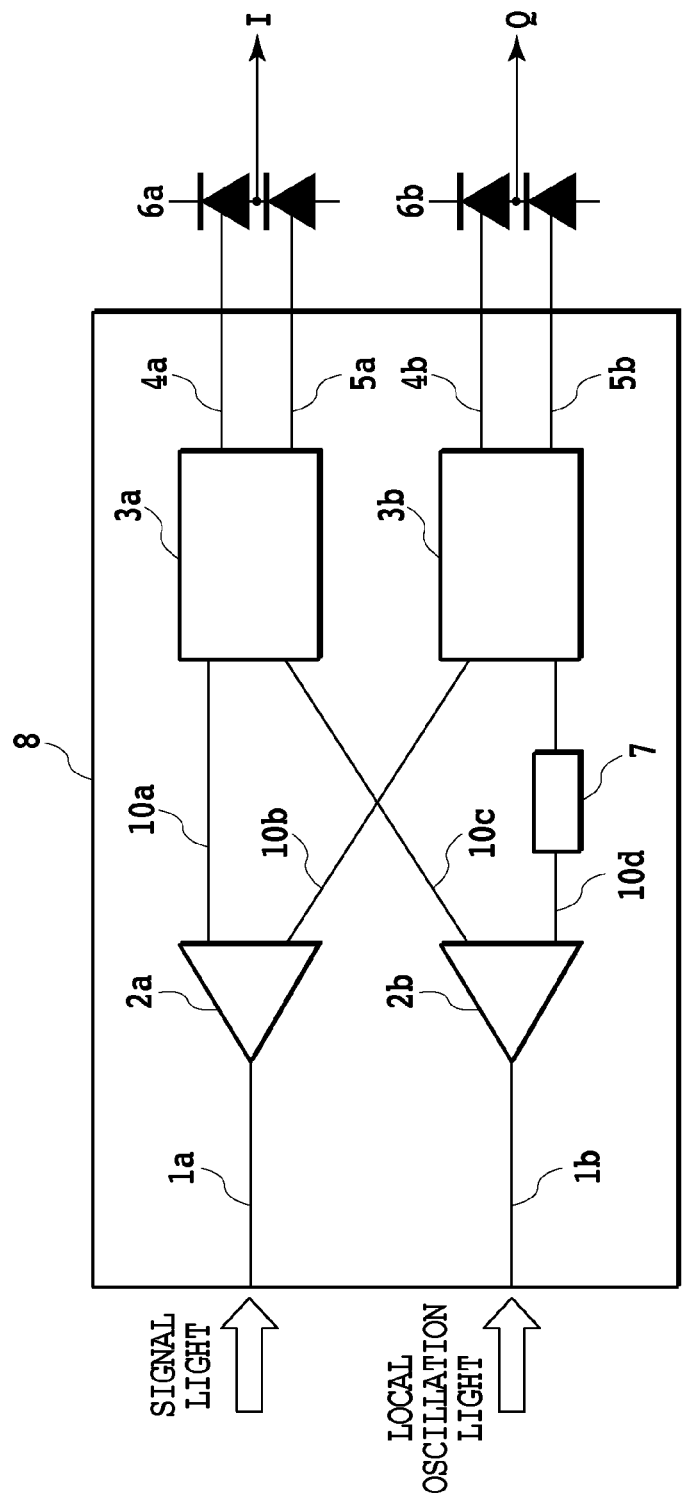
FIG. 1 is a construction diagram showing a conventional optical 90-degree hybrid circuit.

A difference of the construction in the present invention from the conventional art shown in FIG. 1 lies in a point of introducing the demultiplexing optical couplers 9a and 9b each provided with the two or more input ports instead of the optical splitter for branching the signal light and the local oscillation light. As a result of the introduction of the demultiplexing optical couplers 9a and 9b, it is possible to simultaneously provide the monitoring light input waveguide 18, the optical splitter 11, the delay line 12, and the optical waveguide 15 within the optical 90-degree hybrid circuit 8. According to the construction in the present invention, it is necessary to connect the delay line 12 and the optical waveguide 15 respectively to the input ports of the demultiplexing optical couplers different with each other. By inputting the monitoring light not interfering with the signal light or the local oscillation light into the monitoring light input waveguide 18, it is possible to monitor the IQ phase difference without interrupting the optical 90-degree hybrid function. Without mentioning, in a case of not inputting the signal light or the local oscillation light, it is possible to monitor the IQ phase difference even if the optical wave interfering with the signal light or the local oscillation light is inputted.

Here, as each of the demultiplexing optical couplers 9a and 9b, a directional coupler or an MMI (multi-mode-interference) coupler provided with two or more input ports and two or more output ports can be used.

Figure 4:
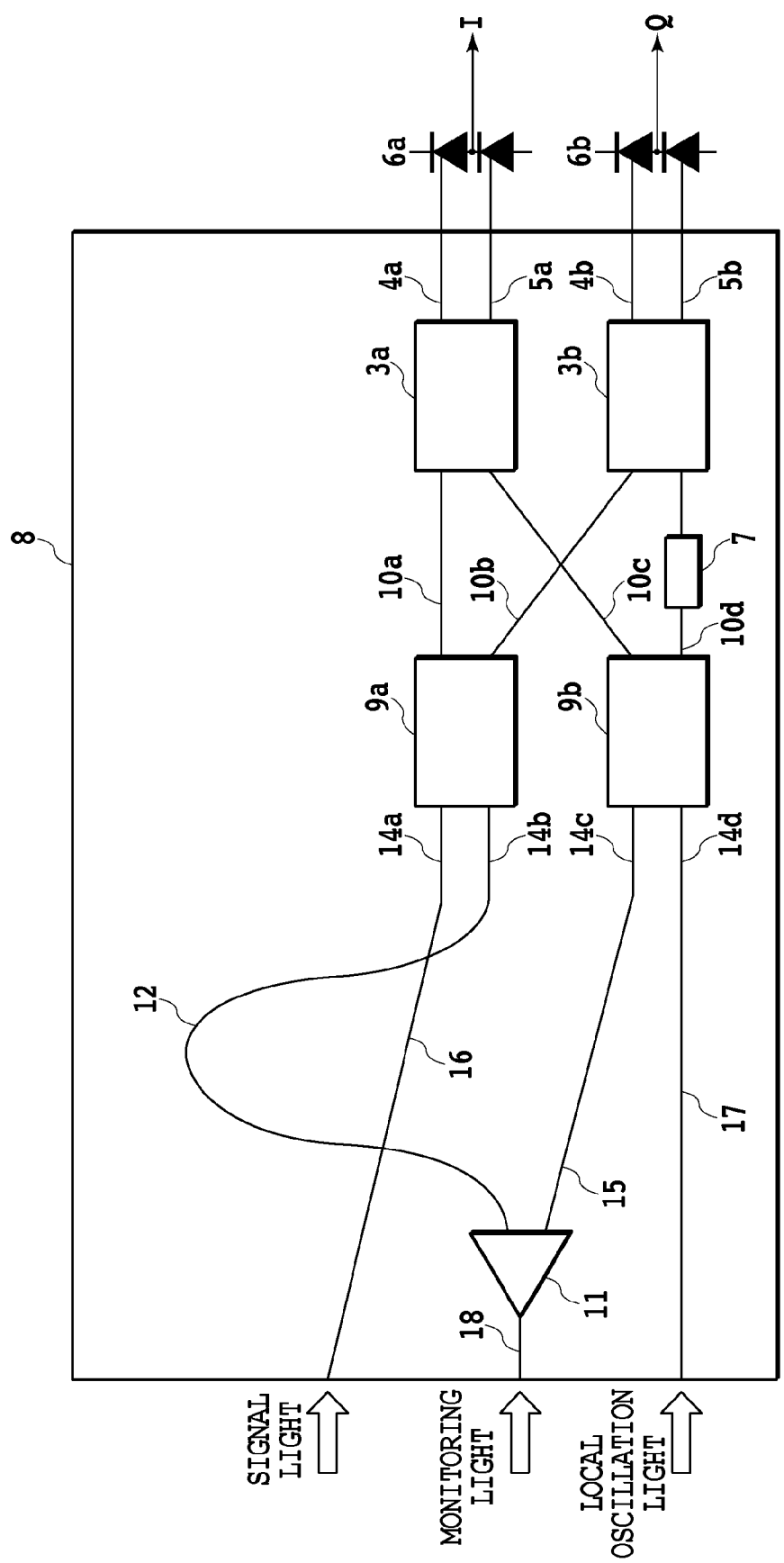
FIG. 4 is a construction diagram showing a different optical 90-degree hybrid circuit according to the embodiment of the present invention.

FIG. 4 is a construction diagram showing an optical 90-degree hybrid circuit according to a different embodiment in the present invention. This construction differs in a point where the optical waveguide 16 is connected to the input waveguide 14a of the demultiplexing optical coupler 9a and the optical waveguide 17 is connected to the input waveguide 14d of the demultiplexing optical coupler 9b, from the construction shown in FIG. 3. Also in the construction shown in FIG. 4, the delay line 12 is connected to the input port of the demultiplexing optical coupler 9a, the optical waveguide 15 is connected to the input port of the demultiplexing optical coupler 9b, and the optical wave not interfering with the signal light or the local oscillation light is inputted into the monitoring light input waveguide 18. Thereby it is possible to monitor the IQ phase difference without interrupting the optical 90-degree hybrid function. Here, in FIG. 4, the optical waveguide 16 intersects with the delay line 12, but even if the optical waveguide 16 is bypassed in such a manner that both do not intersect to be connected to the demultiplexing optical coupler 9a, the effect of the present invention is not damaged.

Figure 5:
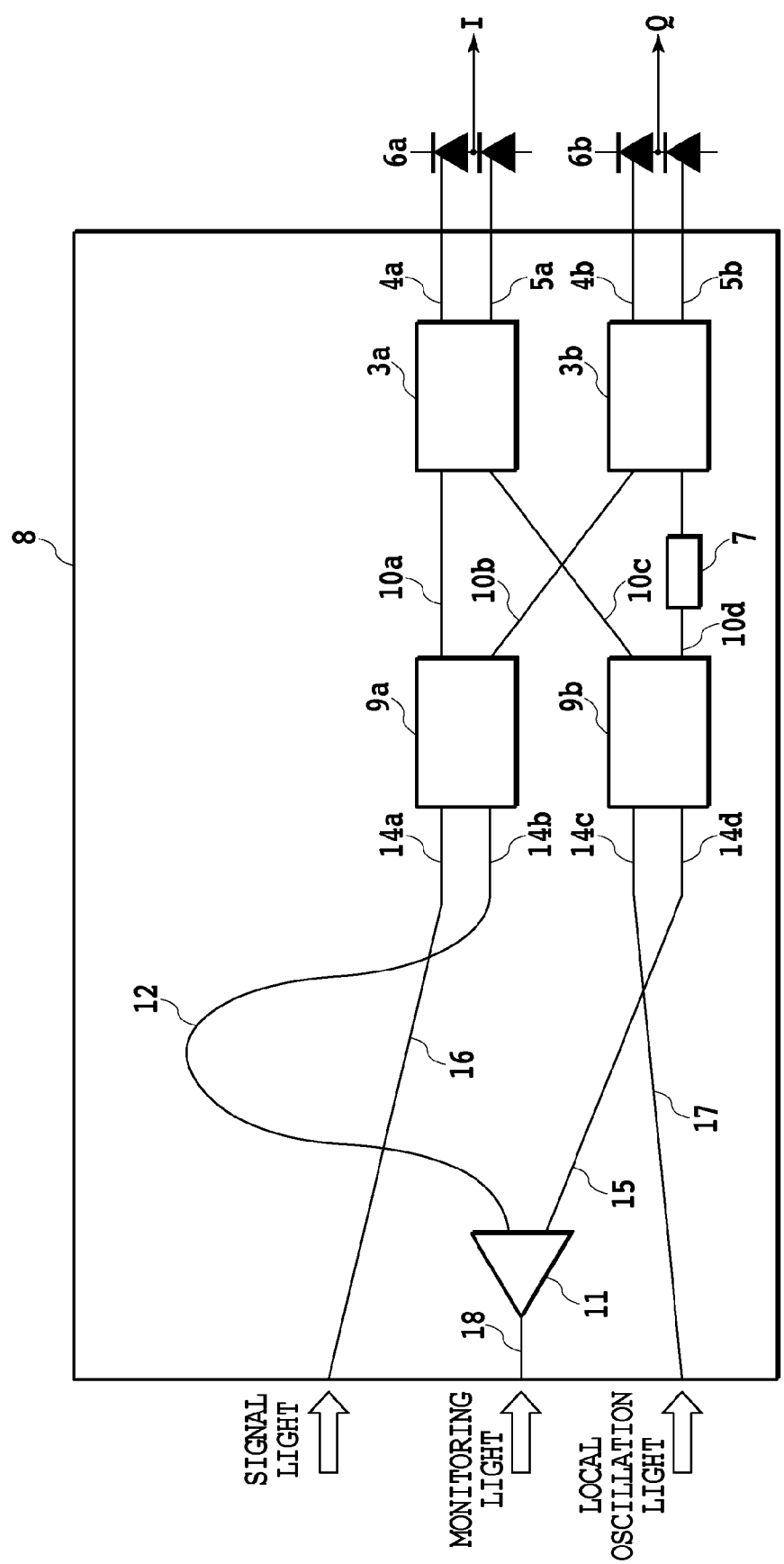
FIG. 5 is a construction diagram showing a further different optical 90-degree hybrid circuit according to the embodiment of the present invention.

FIG. 5 is a construction diagram showing an optical 90-degree hybrid circuit according to a different embodiment in the present invention. This construction differs in a point where the optical waveguide 16 is connected to the input waveguide 14a of the demultiplexing optical coupler 9a and the optical waveguide 17 is connected to the input waveguide 14c of the demultiplexing optical coupler 9b, from the construction shown in each of FIG. 3 and FIG. 4. Also in the construction shown in FIG. 5, the delay line 12 is connected to the input port of the demultiplexing optical coupler 9a, the optical waveguide 15 is connected to the input port of the demultiplexing optical coupler 9b, and the optical wave not interfering with the signal light or the local oscillation light is inputted into the monitoring light input waveguide 18. Thereby it is possible to monitor the IQ phase difference without interrupting the optical 90-degree hybrid function. Here, in FIG. 5, the optical waveguide 16 intersects with the delay line 12, but even if the optical waveguide 16 is bypassed in such a manner that both do not intersect to be connected to the demultiplexing optical coupler 9a, the effect of the present invention is not damaged.

As described above, in the optical 90-degree hybrid circuit of the present invention shown in each of FIG. 3, FIG. 4 and FIG. 5, the optical splitters 2a and 2b for branching the signal light and the local oscillation light used in the conventional art are replaced by the demultiplexing optical couplers 9a and 9b provided with the two or more input ports. Therefore, the optical 90-degree hybrid circuit enabling simultaneous realization of the optical hybrid function and the IQ phase difference evaluation is realized. However, the present invention is not limited to the above construction example, but the effect of the present invention can be achieved by replacing the optical splitter branching the light inputted from the PLC external in the propagation route of the light for the demultiplexing optical coupler. Hereinafter, an explanation thereof will be made with a special example.

A method of achieving the effect of the present invention in the optical circuit integrating a polarization beam splitter (PBS) in the optical 90-degree hybrid circuit will be explained as the special example. The circuit integrating the PBS in the optical 90-degree hybrid circuit becomes an important construction component of the optical receiver in the polarization multiple coherent receiver system represented by the DP-QPSK modulation method or the like.

Figure 6:
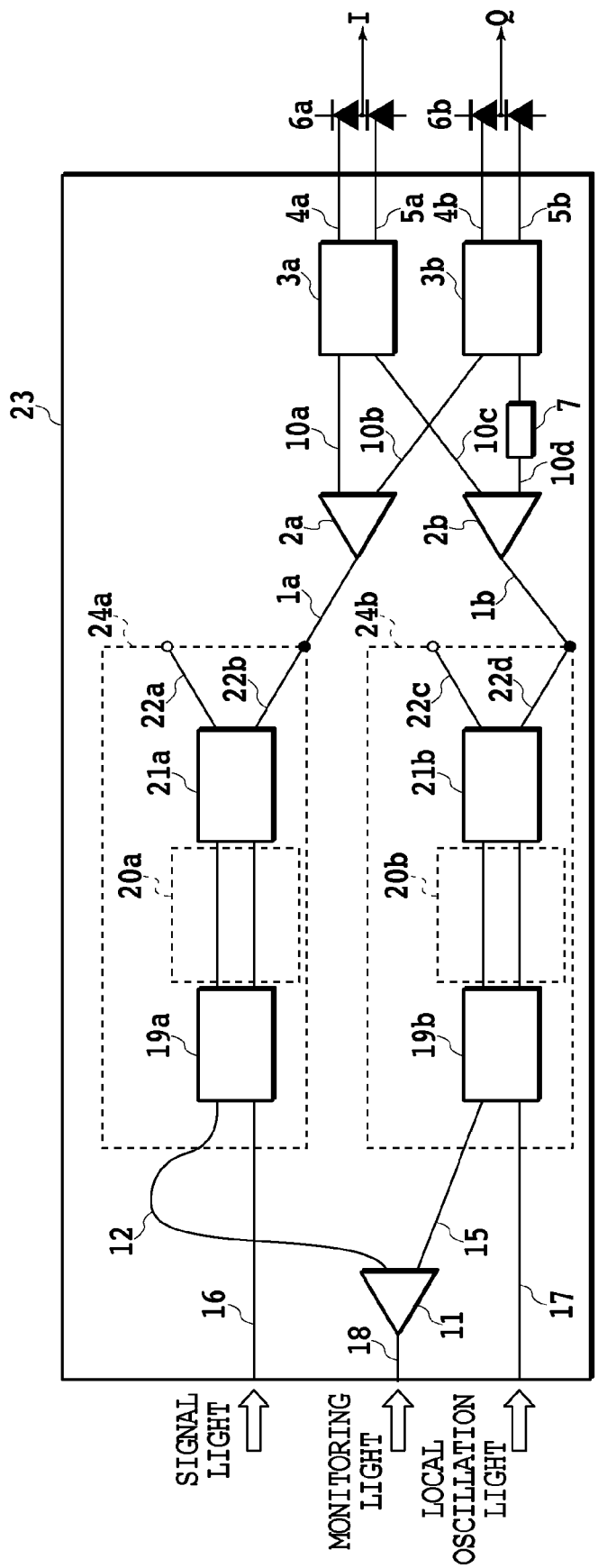
FIG. 6 is a construction diagram showing a circuit integrating a PBS function in an optical 90-degree hybrid circuit according to the present invention.

FIG. 6 is a construction diagram showing a circuit integrating a PBS function in an optical 90-degree hybrid circuit according to the present invention. A PBS function achieving section 24a is constructed of a PBS input optical coupler 19a, a waveguide double refraction controller 20a, a PBS optical coupler 21a, and PBS output waveguides 22a and 22b. A PBS function achieving section 24b is constructed of a PBS input optical coupler 19b, a waveguide double refraction controller 20b, a PBS optical coupler 21b, and PBS output waveguides 22c and 22d.

An operation principle of the PBS function achieving section has no relation to the effect of the present invention, and therefore, an explanation thereof is omitted. The operation principle of the PBS function achieving section is described in NPL 2, for example. The optical waveguide 16 is connected to the PBS input optical coupler 19a, the optical waveguide 17 is connected to the PBS input optical coupler 19b, the optical splitter 2a is connected to the PBS output waveguide 22b, and the optical splitter 2b is connected to the PBS output waveguide 22d. Thereby the optical circuit integrating the PBS function and the optical 90-degree hybrid function is realized. Here, in regard to a method of connecting the PBS output waveguides 22a and 22b and the optical splitter 2a and a method of connecting the PBS output waveguides 22c and 22d and the optical splitter 2b, attention is required for each connection in such a manner that the same polarization is inputted into the optical splitters 2a and 2b.

The first important point for achieving the effect of the present invention lies in that the two or more input ports are provided in each of the PBS input optical couplers 19a and 19b to which the input light from the PLC external is branched through the propagation route for input. The second point lies in a point where the delay line 12 or the optical waveguide 15 is connected to the port, into which the signal light and the local oscillation light are not inputted, in the input ports of each of the PBS input optical couplers 19a and 19b. By inputting the optical wave not interfering with the signal light or the local oscillation light into the monitoring light input waveguide 18, it is possible to monitor the IQ phase difference without damaging the PBS function and the optical 90-degree hybrid function.

It should be noted that in FIG. 6, the optical propagation route is not connected following the PBS output waveguides 22a and 22c, but an input waveguide constituting another optical 90-degree hybrid circuit may be optically connected to the PBS output waveguides 22a and an input waveguide constituting the other optical 90-degree hybrid circuit may be optically connected to the PBS output waveguides 22c. Therefore, it is possible to simultaneously monitor also an IQ phase difference in the other optical 90-degree hybrid circuit.

As a special example of being capable of achieving the effect of the present invention by replacing the splitter for branching the propagation route of the light inputted from the PLC external into two ones for a demultiplexing optical coupler, an explanation will be made of a method of achieving the effect of the present invention in the optical circuit integrating a variable optical attenuator (VOA) in an optical 90-degree hybrid circuit. The integration of the VOA function to the optical 90-degree hybrid circuit is regarded as an addition of an important function for protecting an electric circuit connected subsequent to the photoelectric conversion section, particularly in the optical 90-degree hybrid circuit into which local oscillation light having a large strength is inputted.

Figure 7:
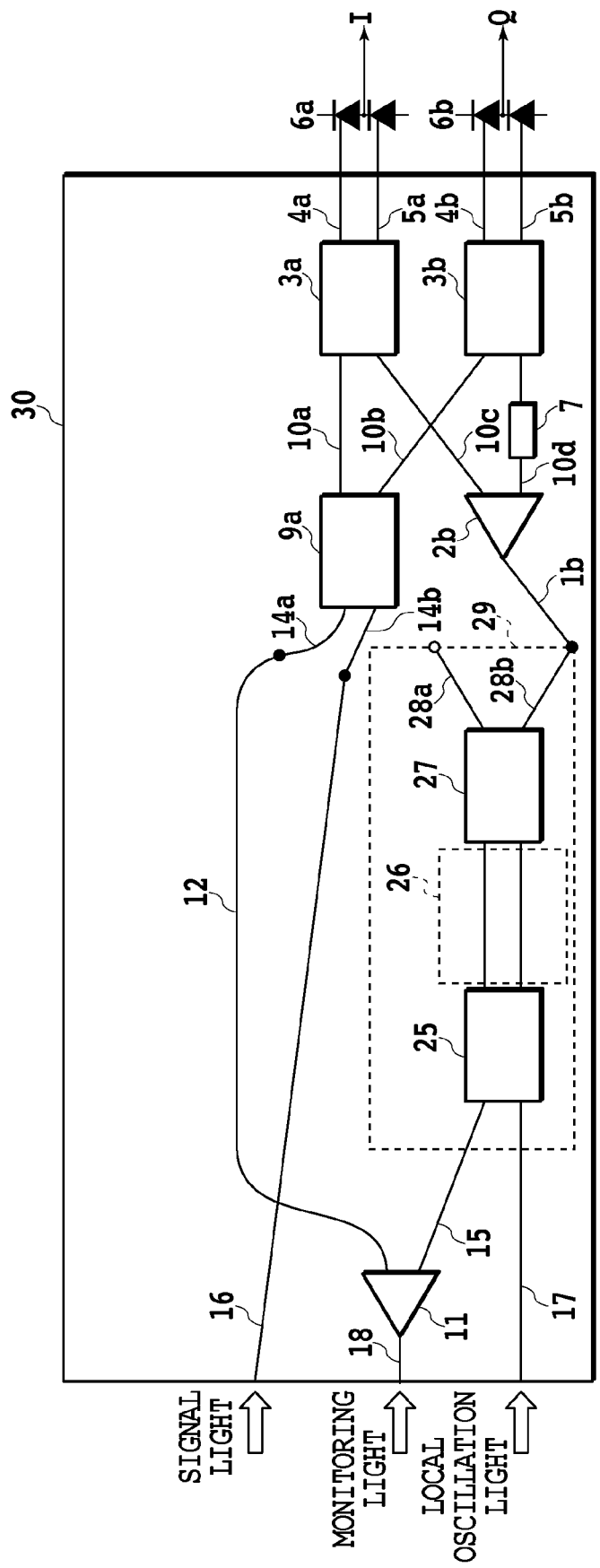
FIG. 7 is a construction diagram showing a circuit integrating a VOA function in the optical 90-degree hybrid circuit according to the present invention.

FIG. 7 is a construction diagram showing a circuit integrating a VOA function in the optical 90-degree hybrid circuit according to the present invention. A VOA function achieving section 29 is constructed of a VOA input optical coupler 25, an output optical strength adjustment mechanism 26, a VOA optical coupler 27, and VOA output waveguides 28a and 28b. The operation principle of the VOA function achieving section has no relation to the effect of the present invention, and therefore an explanation thereof is omitted. The operation principle of the VOA function achieving section is described in NPL 3, for example.

The optical waveguide 16 is connected to the input waveguide 14b, the optical waveguide 17 is connected to the VOA input optical coupler 25 and the optical splitter 2b is connected to the VOA output waveguide 28b. Thereby the optical circuit integrating the VOA function and the optical 90-degree hybrid function is realized. The first important point for achieving the effect of the present invention lies in a point where each of the demultiplexing optical coupler 9a and the VOA input optical coupler 25 is provided with two or more input ports. The second point lies in a point where the delay line 12 or the optical waveguide 15 is connected to the input port, into which the signal light and the local oscillation light are not inputted, among the input ports of each of the demultiplexing optical coupler 9a and the VOA input optical coupler 25. In the construction of the present invention, it is necessary to connect the delay line 12 to the demultiplexing optical coupler 9a and connect the optical waveguide 15 to the VOA input optical coupler 25. By inputting the optical wave not interfering with the signal light or the local oscillation light into the monitoring light input waveguide 18, it is possible to monitor the IQ phase difference without damaging the VOA function and the optical 90-degree hybrid function.

It should be noted that in the construction of the present invention explained above, the input position of each of the signal light and the local oscillation light is defined, but even in a case of replacing the input position of the signal light and the input position of the local oscillation light with each other, it is apparent that the function of the optical 90-degree hybrid circuit of separating I component and Q component intersected vertically with each other is effected and the effect of the present invention is not damaged.

First Embodiment

Figure 8:
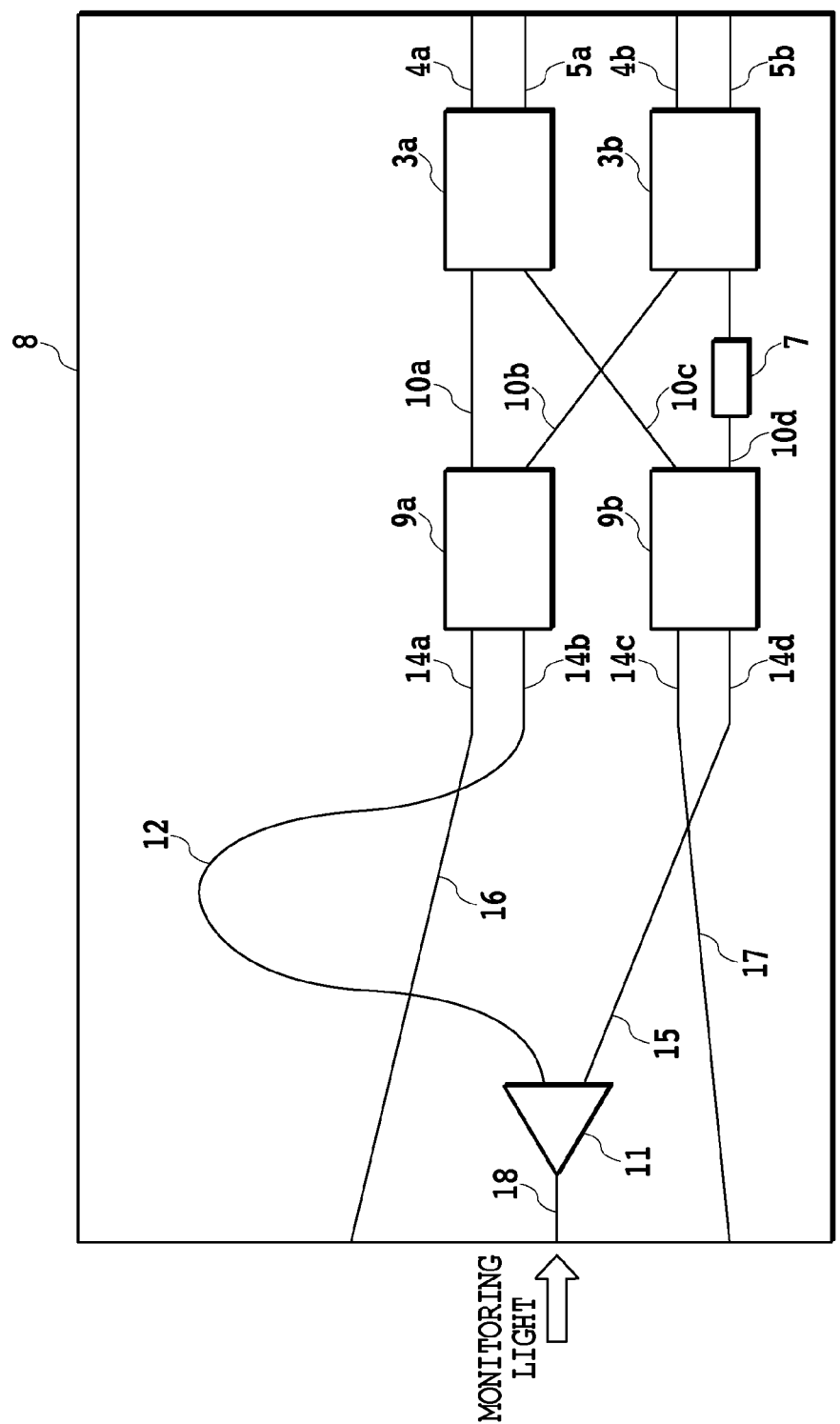
FIG. 8 is a schematic diagram showing an optical 90-degree hybrid circuit according to a first embodiment of the present invention.

FIG. 8 is a schematic diagram showing an optical 90-degree hybrid circuit having an IQ phase difference monitoring function according to a first embodiment actually produced. In the present embodiment, an MMI coupler provided with two input ports and two output ports was used as each of the demultiplexing optical couplers 9a and 9b. The PLC technology was used for production of an optical 90-degree hybrid circuit. Specially flame hydrolysis deposition and reactive ion etching were used to produce a silica-based glass waveguide on a silicon substrate. A cross section configuration of a core has a four-way angle of 4.5 μm, and a specific refraction index difference is 1.5%. The core was embedded by an over-clad glass of having a thickness of 30 μm. For evaluating the IQ phase difference experimentally, the monitoring light was inputted into the monitoring light input waveguide and transmission spectra outputted from the output waveguides 4a, 4b, 5a and 5b were measured. Based upon the measured transmission spectra outputted from the output waveguides 4a, 4b, 5a and 5b, it is possible to calculate relative phase differences between lights outputted from the output waveguides 4a, 4b, 5a and 5b.

Figure 2:
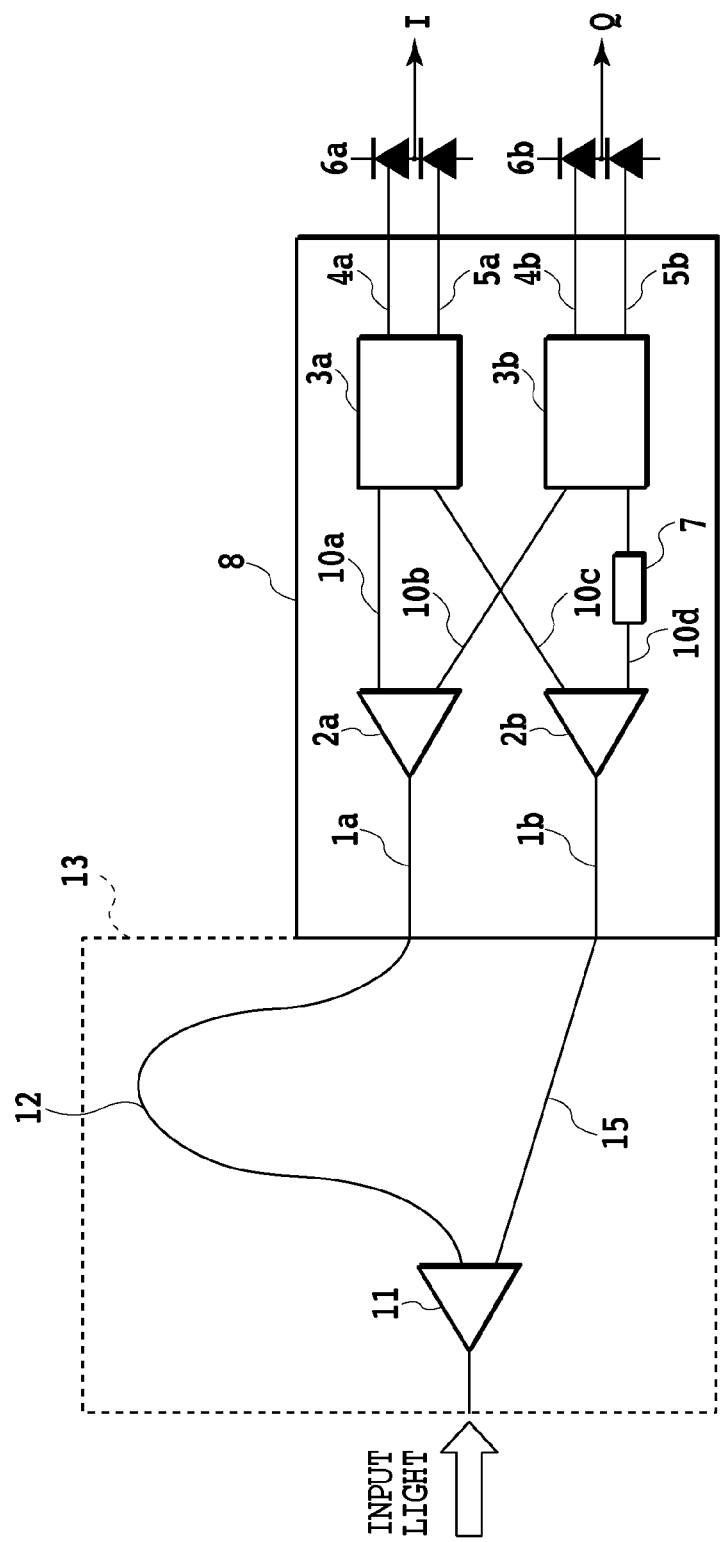
FIG. 2 is a construction diagram showing a measurement method of an IQ phase difference in the conventional optical 90-degree hybrid circuit.
Figure 9A:
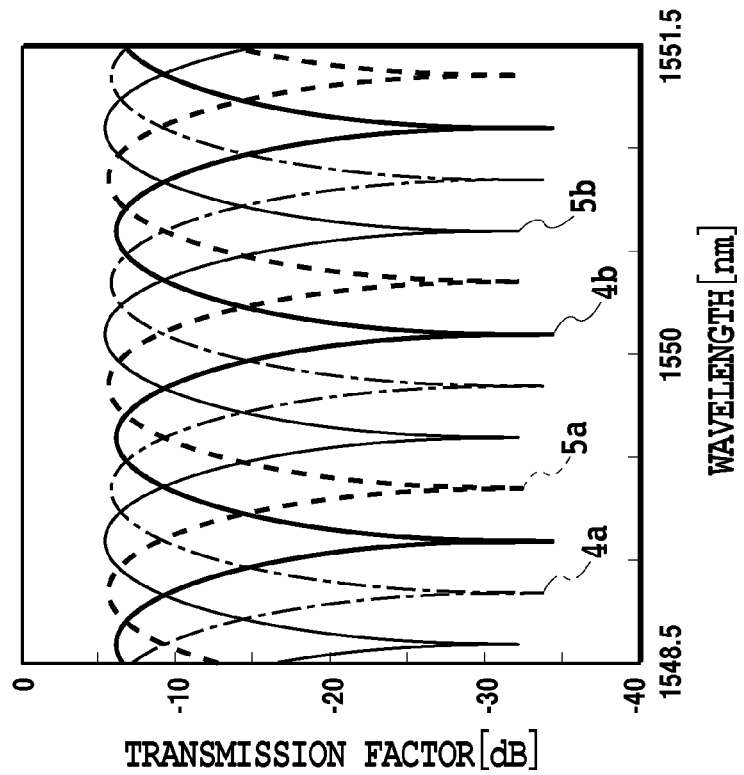
FIG. 9A is a diagram showing a transmission spectra measurement result in the optical 90-degree hybrid circuit according to the first embodiment of the present invention.
Figure 9B:
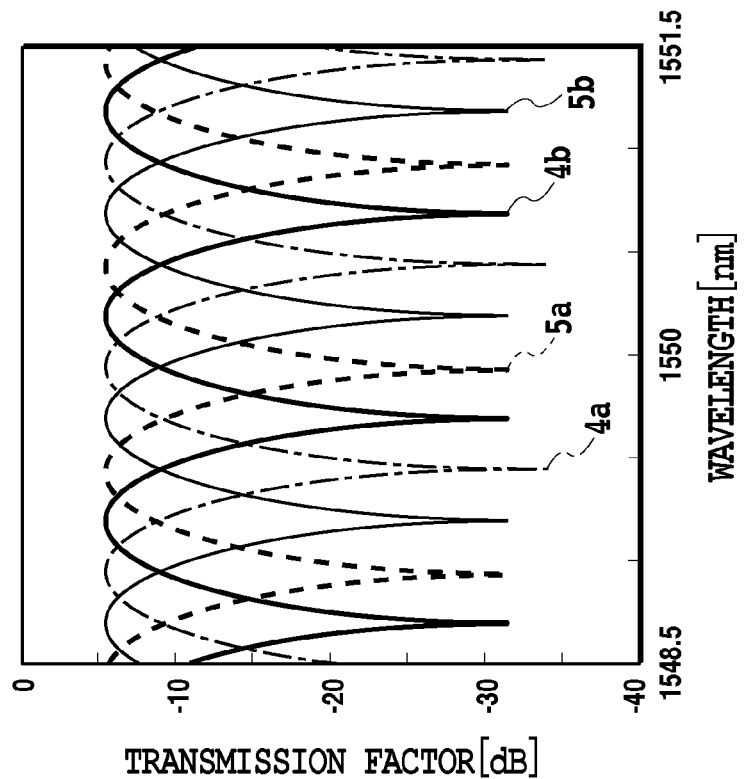
FIG. 9B is a diagram showing a transmission spectra measurement result in the conventional optical 90-degree hybrid circuit.

FIG. 9A is a diagram showing a transmission spectra measurement result in the produced optical 90-degree hybrid circuit. For comparison with the conventional art, the optical 90-degree hybrid circuit having the conventional optical circuit delay circuit (FIG. 2) was produced in the same production process as that of the first embodiment in the present invention to evaluate phase differences between the respective outputs. The result was shown together in FIG. 9A and FIG. 9B. An optical path length difference between the delay line 12 and the optical waveguide 15 was designed in such a manner that a FSR (free spectral range) of the output spectra of the optical 90-degree hybrid circuit with the optical delay circuit section was about 120 GHz in both of the construction of the first embodiment in the present invention and the construction of the conventional art. FIG. 9A shows the transmission spectra measurement result in the optical 90-degree hybrid circuit according to the first embodiment of the present invention. FIG. 9B shows the transmission spectra measurement result in the conventional optical 90-degree hybrid circuit.

Figure 10A:
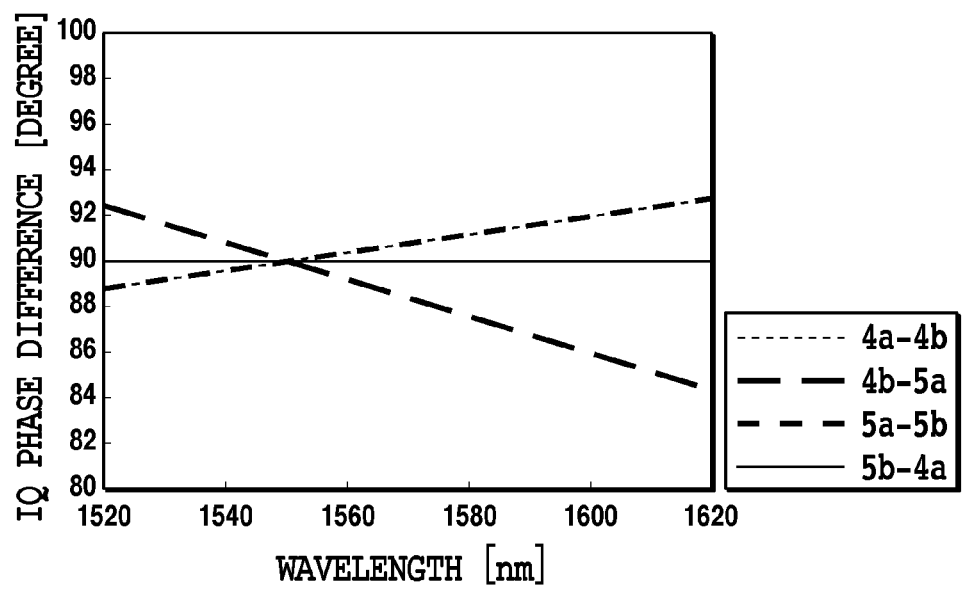
FIG. 10A is a diagram showing an evaluation result of an IQ phase difference in the optical 90-degree hybrid circuit according to the first embodiment of the present invention.
Figure 10B:
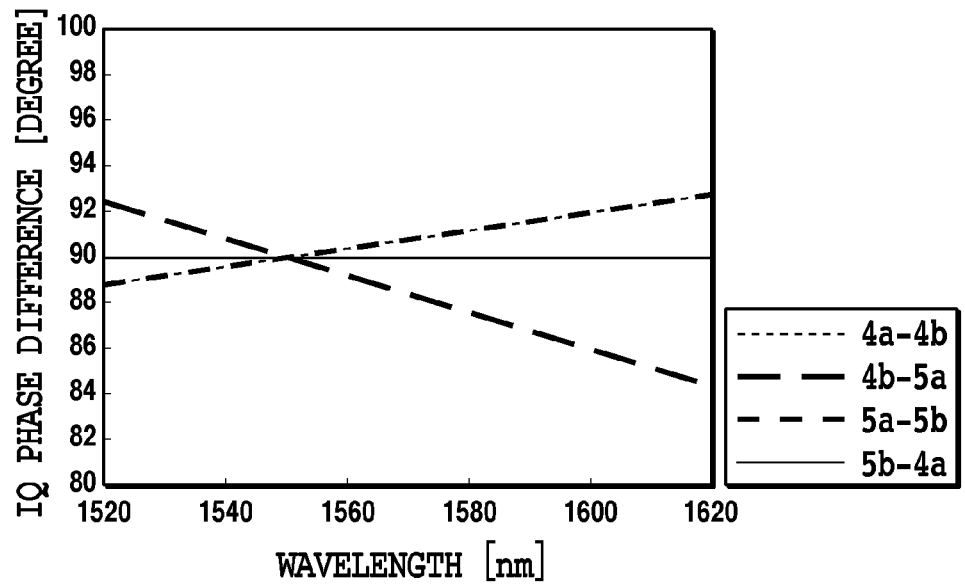
FIG. 10B is a diagram showing an evaluation result of an IQ phase difference in the conventional optical 90-degree hybrid circuit.

FIG. 10A and FIG. 10B are diagrams each made by plotting a phase difference between the respective outputs calculated from the transmission spectra measurement result shown in each of FIG. 9A and FIG. 9B as a function of an input optical wavelength. FIG. 10A shows the IQ phase difference evaluation result according to the first embodiment of the present invention, and FIG. 10B shows the IQ phase difference evaluation result according to the conventional construction. The IQ phase difference evaluation result according to the first embodiment of the present invention is in agreement with the IQ phase difference evaluation result according to the conventional construction, and the effect of the circuit construction in the present invention of monitoring the IQ phase difference without damaging the function of the optical 90-degree hybrid was experimentally confirmed. It should be noted that here, the explanation was made by taking the MMI coupler as an example, but each of the demultiplexing optical couplers 9a and 9b constituting the present invention is not limited to the MMI coupler, and the directional coupler provided with two input ports and two output ports may be used.

Second Embodiment

Figure 11:
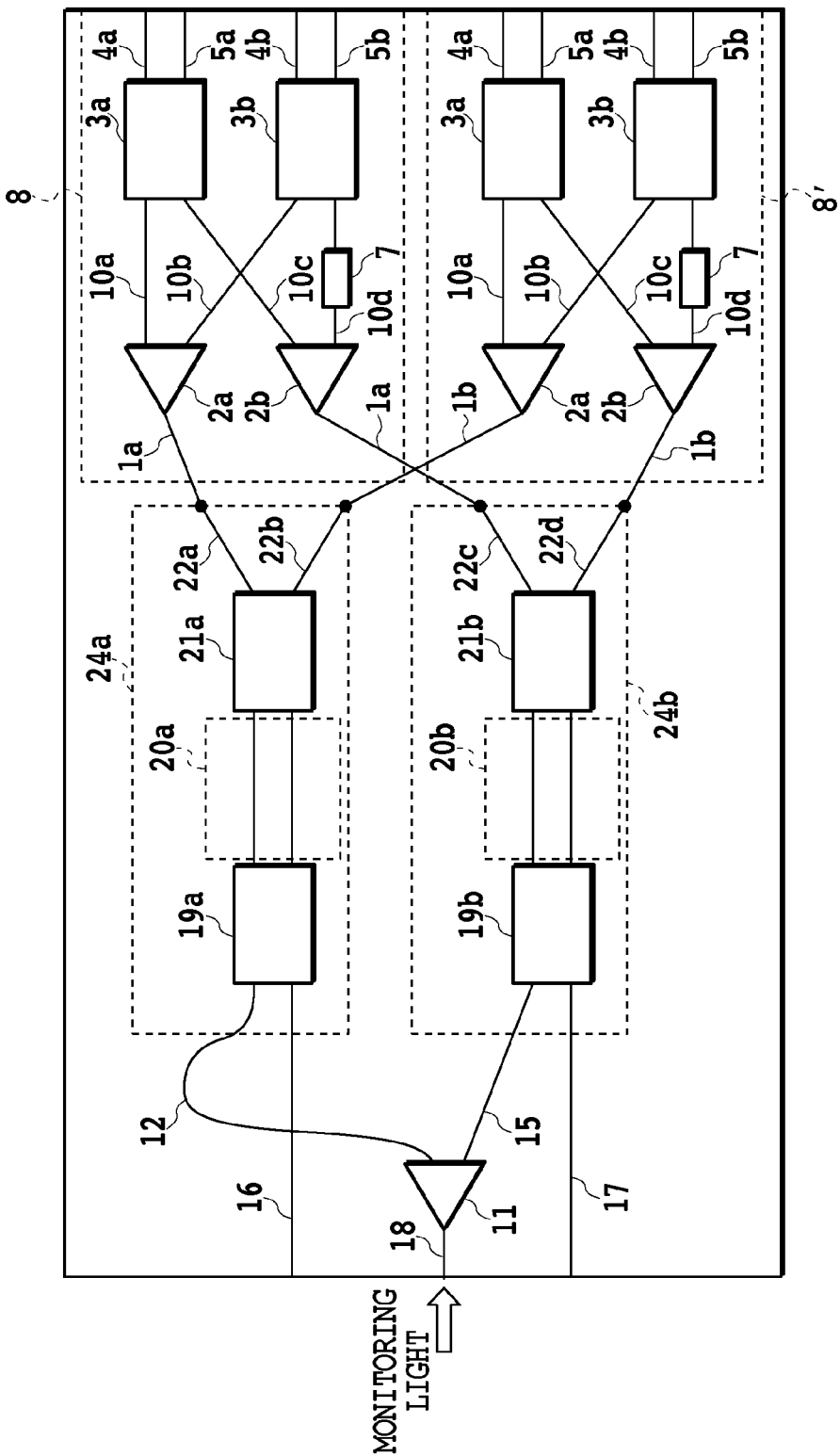
FIG. 11 is a schematic diagram showing an optical 90-degree hybrid circuit according to a second embodiment of the present invention.

FIG. 11 shows a schematic diagram of an optical 90-degree hybrid circuit having an IQ phase difference monitoring function and a PBS function according to a second embodiment actually produced. It should be noted that the present construction includes two optical 90-degree hybrid circuits 8 and 8', wherein by integration with PBS, the output light can be separated corresponding to a polarization state of the input light and also it is possible to separate I component and Q component of each polarization light. The construction in the second embodiment is particularly an optical circuit suitable as a component constituting an optical receiver in the polarization multiple coherent receiver system represented by the DP-QPSK modulation method or the like.

An optical path length difference between the delay line 12 and the optical waveguide 15 was designed in such a manner that the FSR of the output spectra of the optical 90-degree hybrid circuit with the optical delay circuit section was about 120 GHz. The PLC technology was used for production of the optical 90-degree hybrid circuit. Specially flame hydrolysis deposition and reactive ion etching were used to produce a silica-based glass waveguide on a silicon substrate. A cross section configuration of a core has a four-way angle of 4.5 μm, and a specific refraction index difference is 1.5%. The core was embedded by an over-clad glass having a thickness of 30 μm. For evaluating the IQ phase difference experimentally, the monitoring light was inputted into the monitoring light input waveguide and transmission spectra outputted from the output waveguides 4a, 4b, 5a and 5b of each of the optical 90-degree hybrid circuits 8 and 8' were measured. Based upon the transmission spectra outputted from the output waveguides 4a, 4b, 5a and 5b of the each, it is possible to calculate relative phase differences between lights outputted from the output waveguides 4a, 4b, 5a and 5b of the each.

Figure 12A:
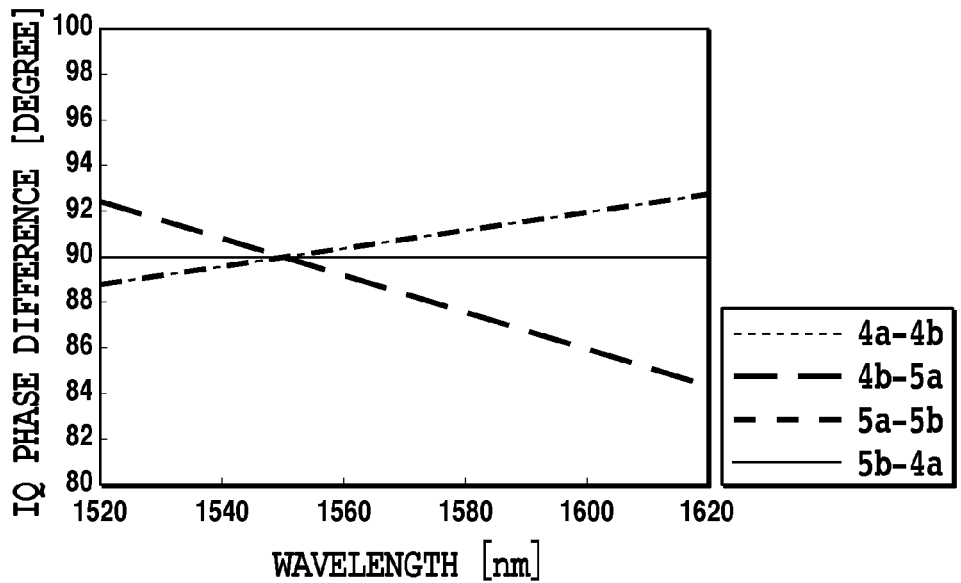
FIG. 12A is a diagram showing an evaluation result of an IQ phase difference in the optical 90-degree hybrid circuit according to the second embodiment of the present invention.
Figure 12B:
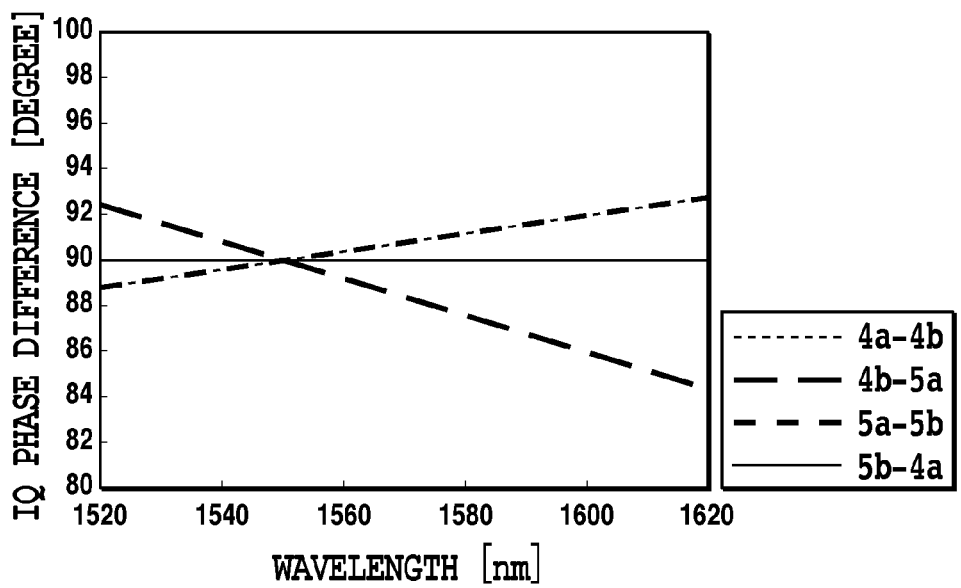
FIG. 12B is a diagram showing the evaluation result of the IQ phase difference in the optical 90-degree hybrid circuit according to the second embodiment of the present invention.

FIG. 12A and FIG. 12B are diagrams each made by plotting a phase difference between the respective outputs from the output waveguides 4a, 4b, 5a and 5b of each of the optical 90-degree hybrid circuits 8 and 8' in FIG. 11 calculated from the transmission spectra measurement result, as a function of an input optical wavelength. FIG. 12A shows the IQ phase difference between the outputs from the output waveguides 4a, 4b, 5a and 5b of the optical 90-degree hybrid circuits 8', and FIG. 12B shows the IQ phase difference between the outputs from the output waveguides 4a, 4b, 5a and 5b of the optical 90-degree hybrid circuits 8. The effect of the circuit construction in the present invention of monitoring the IQ phase difference without damaging the function of the optical 90-degree hybrid was experimentally confirmed. It should be noted that the present embodiment is characterized in that by introduction of the single optical delay circuit section, it is realized to simultaneously make the evaluations regarding the IQ phase differences of the two optical 90-degree hybrid circuits.

Third Embodiment

Figure 13:
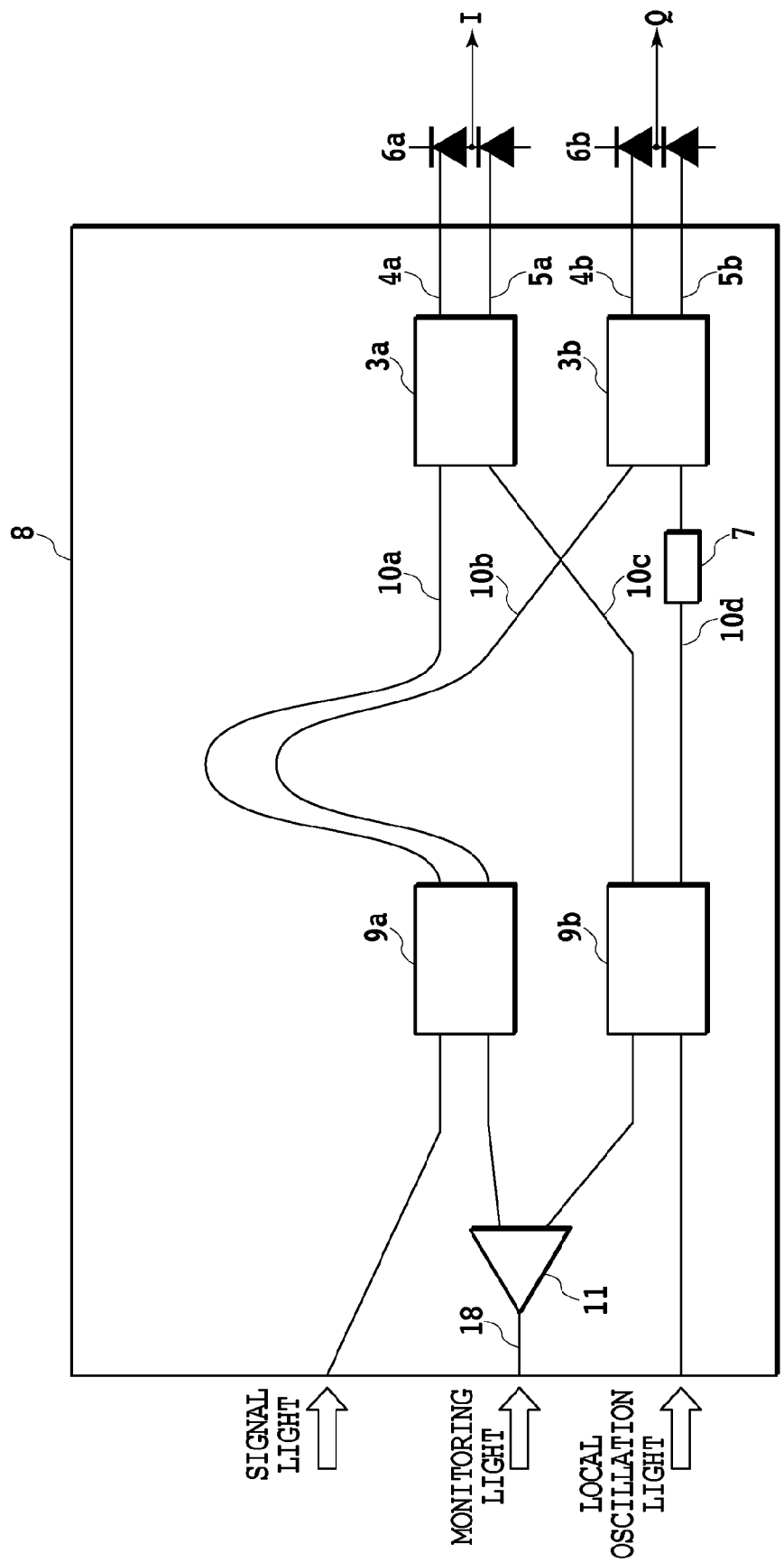
FIG. 13 is a schematic diagram showing an optical 90-degree hybrid circuit according to a third embodiment of the present invention.

FIG. 13 shows a third embodiment according to the present invention. The present embodiment is constructed so that an optical path length of the optical waveguide 15 is equal to that of the delay line 12, and an optical path length of the two first arm waveguides 10a and 10b is different from that of the two second arm waveguides 10c and 10d. Also in the present construction, the monitoring light inputted from the monitoring light input waveguide 18 is branched into two lights in the optical splitter 11. Since there exists a difference in an optical path length between a route in which the light travels via the demultiplexing optical coupler 9a to the optical coupler 3a or 3b and a route in which the light travels via the demultiplexing optical coupler 9b to the optical couplers 3a or 3b, a circuit in which the light travels from the input waveguide 18 to the output waveguides 4a, 4b, 5a, and 5b functions as a delay interferometer. That is, by measuring transmission spectra outputted from the output waveguides 4a, 4b, 5a, and 5b, it is possible to evaluate the phase difference between the respective outputs. Accordingly the effect of the present invention similar to that of the above-mentioned embodiment can be realized by using the present embodiment.

INDUSTRIAL APPLICABILITY

The present invention can be used as the optical 90-degree hybrid circuit which is the construction component of the optical receiver used in the coherent receiver system in the optical transmission system.

The invention claimed is:
1. An optical 90-degree hybrid circuit comprising:
a first input waveguide;
a first demultiplexing optical coupler including at least two first input ports and at least two first output ports, wherein the first input waveguide is connected to one of the first input ports and light inputted into the first input waveguide is branched;
a second input waveguide;
a second demultiplexing optical coupler including at least two second input ports and at least two second output ports, wherein the second input waveguide is connected to one of the second input ports and light inputted into the second input waveguide is branched;
two first arm waveguides connected to two of the first output ports;
two second arm waveguides connected to two of the second output ports;
a 90-degree phase shift section installed in one of the four arm waveguides composed of the two first arm waveguides and the two second arm waveguides to shift a phase of light by 90 degrees;
a first optical coupler connected to one of the two first arm waveguides and one of the two second arm waveguides;
a second optical coupler connected to the other of the two first arm waveguides and the other of the two second arm waveguides;
a third input waveguide;
an optical splitter connected to the third input waveguide and branching light inputted into the third input waveguide into two lights;
a first optical waveguide connecting the optical splitter and the one remaining port of the first input ports; and
a second optical waveguide connecting the optical splitter and the one remaining port of the second input ports,
wherein an optical path length of the first optical waveguide is different from that of the second optical waveguide.

2. An optical 90-degree hybrid circuit according to claim 1, wherein the first demultiplexing optical coupler comprises a first polarization beam splitter including the two first input ports and branching the inputted light into two lights corresponding to a polarization state and a first splitter connected to the first polarization beam splitter for branching the inputted light into two lights, and
wherein the second demultiplexing optical coupler comprises a second polarization beam splitter including the two second input ports and branching the inputted light into two lights corresponding to a polarization state and a second splitter connected to the second polarization beam splitter for branching the inputted light into two lights.

3. An optical 90-degree hybrid circuit according to claim 1, wherein
the second demultiplexing optical coupler comprises:
an optical attenuator for adjusting a strength level of the inputted light; and
an optical splitter connected to the optical attenuator for branching the inputted light into two lights.

4. An optical 90-degree hybrid circuit comprising:
a first input waveguide;
a first demultiplexing optical coupler including at least two first input ports and at least two first output ports, wherein the first input waveguide is connected to one of the first input ports and light inputted into the first input waveguide is branched;
a second input waveguide;
a second demultiplexing optical coupler including at least two second input ports and at least two second output ports, wherein the second input waveguide is connected to one of the second input ports and light inputted into the second input waveguide is branched;
two first arm waveguides connected to two of the first output ports;
two second arm waveguides connected to two of the second output ports;
a 90-degree phase shift section installed in any one of the two second arm waveguides to shift a phase of light by 90 degrees;
a first optical coupler connected to one of the two first arm waveguides and one of the two second arm waveguides;
a second optical coupler connected to the other of the two first arm waveguides and the other of the two second arm waveguides;
a third input waveguide;
an optical splitter connected to the third input waveguide and branching light inputted into the third waveguide into two lights;
a first optical waveguide connecting the optical splitter and the one remaining port of the first input ports;
a second optical waveguide connecting the optical splitter and the one remaining port of the second input ports, wherein an optical path length of the two first arm waveguides is different from that of the two second arm waveguides.

* * * * *